(12) United States Patent
DiAntonio et al.

(10) Patent No.: US 8,483,929 B2
(45) Date of Patent: Jul. 9, 2013

(54) METHOD OF CONTROLLING AN AIR PREHEATING SYSTEM OF A GAS TURBINE

(75) Inventors: Gregory L. DiAntonio, Marietta, GA (US); Erwing Calleros, Roswell, GA (US); Renhua Wang, Marietta, GA (US); Aydin M. Abdollahian, Atlanta, GA (US); Troy A. Michaud, Smyrna, GA (US)

(73) Assignee: General Electric Company, Schenectady, NY (US)

( * ) Notice: Subject to any disclaimer, the term of this patent is extended or adjusted under 35 U.S.C. 154(b) by 1265 days.

(21) Appl. No.: 12/275,299

(22) Filed: Nov. 21, 2008

(65) Prior Publication Data
US 2010/0131169 A1    May 27, 2010

(51) Int. Cl.
*G06F 19/00* (2006.01)
*G06G 7/70* (2006.01)

(52) U.S. Cl.
USPC .......................................................... 701/100

(58) Field of Classification Search
USPC .................................................. 701/99, 100
See application file for complete search history.

(56) References Cited

U.S. PATENT DOCUMENTS

| | | | |
|---|---|---|---|
| 3,703,807 A * | 11/1972 | Rice | 60/39.182 |
| 3,986,347 A * | 10/1976 | Schirmer | 60/772 |
| 6,543,214 B2 * | 4/2003 | Sasaki et al. | 60/39.5 |
| 6,584,776 B2 * | 7/2003 | Mittricker et al. | 60/775 |
| 7,644,573 B2 * | 1/2010 | Smith et al. | 60/39.182 |
| 2008/0127647 A1 * | 6/2008 | Leitner | 60/645 |
| 2009/0064653 A1 * | 3/2009 | Hagen et al. | 60/39.3 |
| 2009/0235634 A1 * | 9/2009 | Wang et al. | 60/39.182 |
| 2010/0031933 A1 * | 2/2010 | Narayan et al. | 123/543 |

* cited by examiner

*Primary Examiner* — Khoi Tran
*Assistant Examiner* — Harry Oh
(74) *Attorney, Agent, or Firm* — Cantor Colburn LLP (57) ABSTRACT

An embodiment of the present invention has the technical effect of controlling an air preheating system integrated with a gas turbine. The present invention may offer the benefit of extending a turndown range by heating the air (hereinafter "inlet-air") entering the compressor of the gas turbine. The present invention may also offer the benefit of increasing an efficiency of the powerplant.

17 Claims, 6 Drawing Sheets

METHOD OF CONTROLLING AN AIR PREHEATING SYSTEM OF A GAS TURBINE

This application is related to commonly-assigned U.S. patent application Ser. No. 12/053,921, filed Mar. 24, 2008.

BACKGROUND OF THE INVENTION

The present invention relates to the operation of a gas turbine, and more particularly to a method for operating an air preheating system integrated with a gas turbine.

Turbomachines, such as gas turbines, aero-derivatives, or the like, commonly operate in a combined-cycle and/or cogeneration mode. In combined-cycle operation, a heat recovery steam generator, which generates steam, receives the exhaust-gas from the gas turbine; the steam then flows to a steam turbine that generates additional electricity. In a cogeneration operation, a portion of the steam generated by the heat recovery steam generator is sent to a separate process requiring the steam.

Combined-cycle and cogeneration plants are rated to generate the maximum amount of energy (mechanical, electrical, etc) while operating at baseload. However, baseload operation, though desired by operators, is not always feasible. There may not be a demand in the energy market (electrical grid, or the like) for all of the energy generated at baseload. Here, the powerplant must either shutdown or operate at partload, where less than the maximum amount of energy is generated. Furthermore, partload operation tends to decrease the overall efficiency and increase the heatrate of the powerplant.

Gas turbines are typically required to maintain emissions compliance while generating power. A gas turbine operating at partload, may not maintain emissions compliance over the entire partload range, (from spinning reserve to near baseload). Turndown range may be considered the loading range where the gas turbine maintains emissions compliance. A broad turndown range allows operators to maintain emissions compliance, minimize fuel consumption, and avoid the thermal transients associated with shutting down the powerplant.

An air preheating system may reduce the extent of the aforementioned disadvantages associated with operating a gas turbine at partload. For the foregoing reasons, there is a need for a method of operating a gas turbine integrated with an air preheating system. The method should allow for extending the turndown range. The method should allow for a reduction in the fuel consumed by the gas turbine while operating at the partload range.

BRIEF DESCRIPTION OF THE INVENTION

In accordance with an embodiment of the present invention, a method of controlling a gas turbine operating at partload the method comprising: providing a gas turbine comprising a compressor, which receives an inlet-air; a combustion system; and a turbine section; wherein the gas turbine produces an exhaust-gas; providing an air preheating system comprising at least one heat exchanging section, wherein the air preheating system heats the inlet-air before the inlet-air flows to the compressor; receiving a operating target; utilizing a fluid to heat the inlet-air; wherein the fluid communicates with the at least one heat exchanging section, and wherein the fluid flows from a source external to the gas turbine; and operating the air preheating system to nearly satisfy the operating target; and determining whether the operating target is within a range.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

The present invention may be applied to a wide variety of gas turbines including, but not limiting of, gas turbines, aero-derivative combustion turbines, and the like. An embodiment of the present invention takes the form of an application and process that may heat the inlet-air entering a gas turbine to increase the turndown range.

An embodiment of the present invention has the technical effect of controlling an air preheating system integrated with a gas turbine. The present invention may offer the benefit of extending a turndown range by heating the air (hereinafter "inlet-air") entering the compressor of the gas turbine. The present invention may also offer the benefit of increasing an efficiency of a powerplant. As described below, the inlet-air is heated by an energy source external to the gas turbine.

Figure 1:
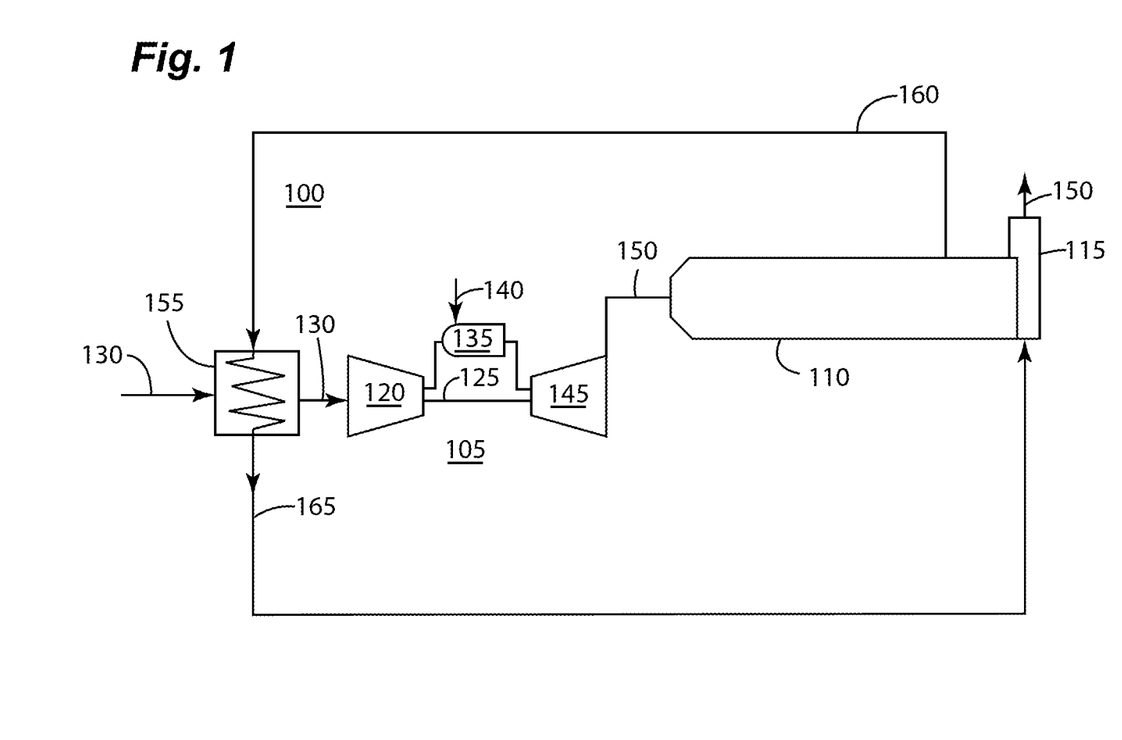
FIG. 1 is a schematic illustrating an example of a first air preheating system in accordance with a first embodiment of the present invention.

Referring now to the Figures, where the various numbers represent like elements throughout the several views. FIG. 1 is a schematic illustrating an example of a first air preheating system 100 for extending the turndown range of a gas turbine 105 in accordance with a first embodiment of the present invention.

FIG. 1 illustrates a site comprising a gas turbine 105; a heat recovery steam generator (HRSG) 110; a stack 115; and an air preheater 155. Generally, the gas turbine 105 comprises an axial flow compressor 120 having a shaft 125. Inlet-air 130 enters the compressor 120, is compressed and then discharged to a combustion system 135, where a fuel 140, such as natural gas, is burned to provide high-energy combustion gases which drives the turbine section 145. In the turbine section 145, the energy of the hot gases is converted into work, some of which is used to drive the compressor 120 through the shaft 125, with the remainder available for useful work to drive a load such as the generator, mechanical drive, or the like (none of which are illustrated). The exhaust-gas 150 from the turbine section 145 may then flow to the HRSG 110, which may transfer a portion of the exhaust-gas energy into steam (not illustrated).

During baseload operation, the combustion system 135 may ensure that the exhaust-gas 150 flowing out of the stack 115 meets the site emissions requirements. Typically, the gas turbine 105 operates at optimum efficiency and heatrate during baseload operation. Depending on the turndown range of the gas turbine 105, certain partload operations may violate the site emissions requirements, which may require the shutdown of the gas turbine 105. Furthermore, turndown operation may decrease the efficiency and increase the heatrate of the gas turbine 105 and powerplant.

An increase in the turndown range may avoid the need to shutdown tie gas turbine 105. Also, an extended turndown range allows for operating the gas turbine 105 at lower loads, while maintaining emissions compliance and consuming less fuel 140. Incorporating an air preheating system 100 may also recover a portion on the efficiency losses and change in heatrate of the powerplant.

Embodiments of the present invention may provide multiple benefits. An embodiment of the present invention may increase the extended turndown range up to about 50% of a rated load of the gas turbine. An embodiment of the present invention may heat the inlet-air to up to about 400 degrees Fahrenheit above an unheated temperature of the inlet-air. An embodiment of the present invention may increase powerplant partload efficiency by up to about 10%.

The present invention may extend the turndown range by heating tie inlet-air 130. Generally, the output (electrical, mechanical, or the like) of a gas turbine 105 is governed by the amount of mass-flow entering the compressor 120. The mass-flow may be considered the product of the density and the volume-flow of the inlet-air 130 entering the compressor 120. The amount of volume-flow entering the compressor 120 may vary on the ambient temperature conditions and the angle of Variable Inlet Guide Vanes (IGVs), if present on the gas turbine 105. The IGV angle may determine the flow area at the inlet of the compressor 120. The IGV angle may be reduced to a minimum angle, limiting the amount of turndown. At the minimum IGV angle, a corresponding minimum volume-flow is drawn into the compressor 120.

In the present invention, the heating of the inlet-air 130 decreases the density, allowing less dense inlet-air 130 to enter the compressor 120. Here, at a given load point the volume-flow entering the compressor 120 may remain constants however the mass-flow decreases due to the decrease in density of the inlet-air 130. As discussed, the output of the gas turbine 105 may be determined by the mass-flow entering the gas turbine 105; therefore less output is produced due to the heating of the inlet-air 130, compared to not heating of the inlet-air 130.

The heating of the inlet-air 130 also increases the temperature (hereinafter "compressor discharge temperature") of the air exiting the compressor 120. This heated air then enters the combustion system 135. The heated air 130 aids in reaching the overall universal reference temperature ("firing temperature") of the gas turbine 105. The heated air allows the gas turbine 105 to consume less fuel 140 to obtain the firing temperature. Here, more fuel 140 would be consumed if unheated inlet-air 130 entered the compressor 120. This feature of an embodiment of the present invention may increase the partload efficiency and decrease the heatrate of the powerplant.

Overall, the present invention incorporates at least one air preheater 155, which may be installed upstream of the compressor 120. The air preheater 155 may be a heat exchanger, coil, or other heat exchanging mechanism. The air preheater 155 may be sized to adequately heat the inlet-air 130 to a temperature that increases the turndown range.

Generally, the temperature of the unheated inlet-air 130 may be determined by the ambient conditions or the outlet temperature of any air conditioning system (not illustrated) located upstream of the air preheater 155. An embodiment of the present invention may increase the temperature of the inlet-air 130 to any temperature allowed for by the air preheater 155. However, the increase in temperature of the inlet-air 130 may be limited by at least one of several factors, such as but not limiting of, the geometrical limitations of the air preheater 155; a temperature that may violate a thermal, operational, or mechanical limitation; or the like. For example, but not limiting of, the first air preheating system 100 may increase the temperature of the inlet-air 130 from approximately 59 degrees Fahrenheit to approximately 120 degrees Fahrenheit. Here, the inlet-air 130 may have an inlet flowrate of approximately 3,000,000 pounds/hour.

The first air preheating system 100, illustrated in FIG. 1, includes at least one air preheater 155, a preheater supply line 160; and a preheater discharge line 165. The preheater supply line 160 allows a portion of the exhaust-gas 150, or other fluid, such as, but not limiting of, water, steam, or the like, to flow from the HRSG 110 to the air preheater 155. In this first embodiment of the present invention, an end of the preheater supply line 160 is connected to a portion of the HRSG 110, where the exhaust-gas 150 may be extracted. The preheater supply line 160 receives a portion of the exhaust-gas 150 from the HRSG 110. The exhaust-gas 150 may flow through the preheater supply line 160, which may have an opposite end connected to a portion of the air preheater 155.

This first embodiment of the present invention allows a user to determine where the exhaust-gas 150 is extracted from on the HRSG 110. The present invention may allow a user to optimize the location on the HRSG 110 where the exhaust-gas 150 is extracted and sent to the air preheater 155. A user may consider a variety of factors when determining the optimized location on the HRSG 110. These factors may include, for example, but not limiting of, the following. Temperature: the temperature of the fluid used to increase the temperature of the inlet-air 130 (exhaust-gas 150, water, steam, or the like), should be higher than the maximum desired temperature that the inlet-air 130 may be raised to by the air preheater 155. The maximum desired temperature might be used for sizing the air preheater 155. Flow: flow of the fluid should be sufficient to supply the air preheater 155, while maintaining sufficient flow for other demands from the HRSG 110, or the like. Fluid type: the use of water, if available, as the fluid for increasing the temperature of the inlet-air 130 may be optimum, possibly requiring less mass-flow and a relatively smaller sized air preheater 155. Energy Source: the fluid may derive from an energy source that may be utilized without negatively impacting the overall benefits of heating the inlet-air 130. The energy source may include, for example, but not limiting of, outlet from a condenser or fuel heater 175; packing flows, or the like: exhaust-gas 150; discharge from the stack 115; any other energy source external to the bottoming cycle.

For example, but not limiting of, an operator of the site may use a portion of the exhaust-gas 150 flowing towards the condenser (not illustrated). Here, this energy may be considered 'low value' because the energy needed to create steam may have been already extracted. However, another site, may extract the exhaust-gas 150 from another area of the HRSG 110. Here, for example, but not limiting of, an operator may decide that instead of restricting the flow of the exhaust-gas 150 entering a section of the HRSG 110, divert a portion of the exhaust-gas 150 to the air preheater 155.

In use, the first air preheating system 100 operates while the gas turbine 105 is baseload or partload. An embodiment of the present invention may divert a portion of the exhaust-gas 150 to the air preheater 155 via the preheater supply 160. The exhaust-gas 150 may flow through an inlet portion of the air preheater 155. As the inlet-air 130 flows through the air preheater 155, the heat from the exhaust-gas 150 is transferred to, and increases the temperature of, the inlet-air 130. After flowing through the air preheater 155, the exhaust-gas 150 may flow through the preheater discharge line 165 to the stack 115 and/or the HRSG 110.

Figure 2:
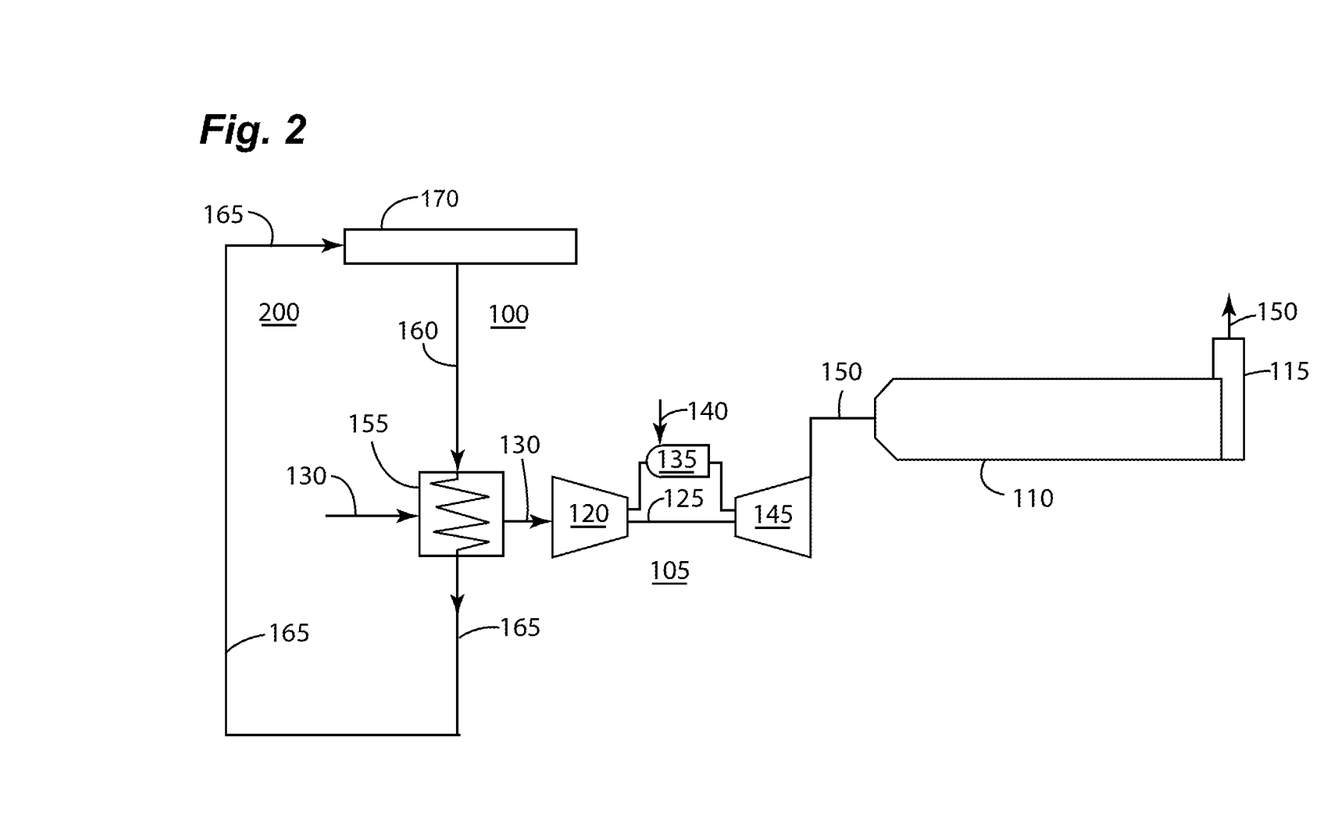
FIG. 2 is a schematic illustrating an example of a second air preheating system in accordance with a second embodiment of the present invention.
Figure 3:
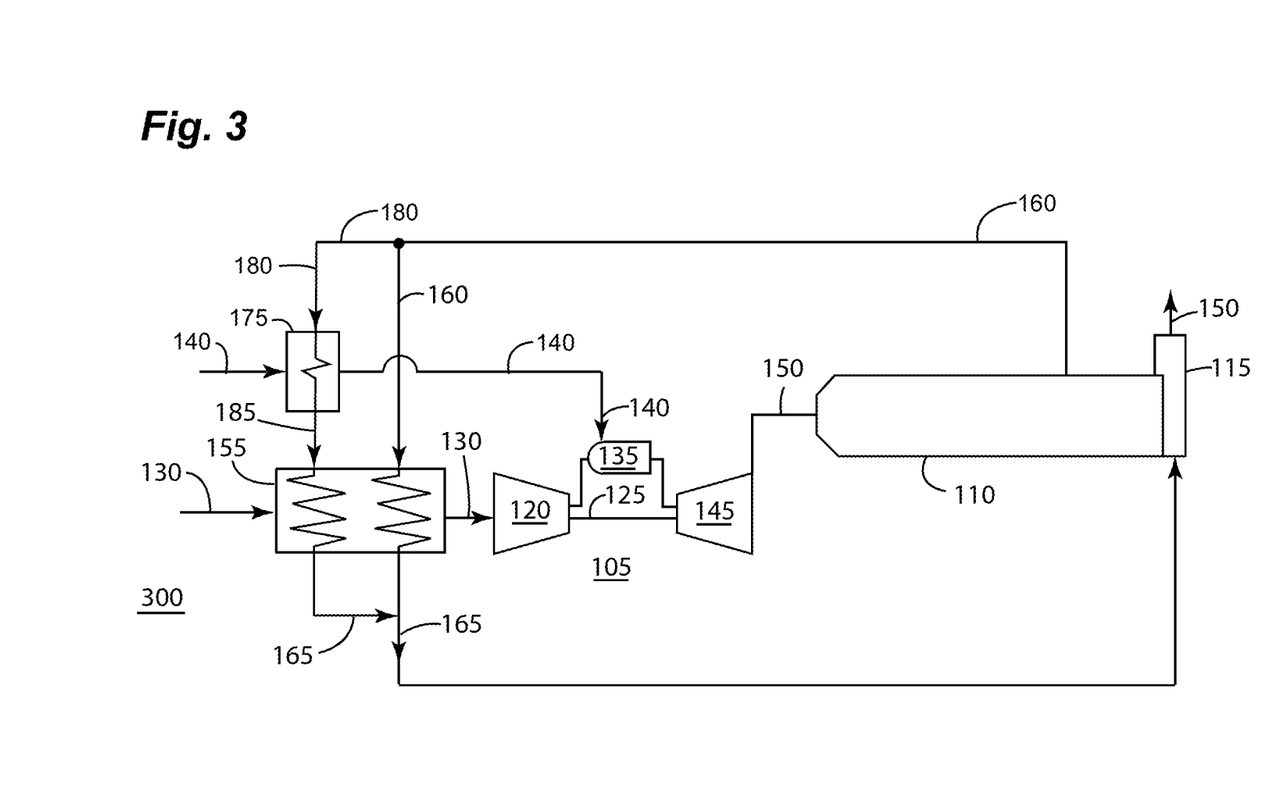
FIG. 3 is a schematic illustrating an example of a third air preheating system in accordance with a third embodiment of the present invention.
Figure 4:
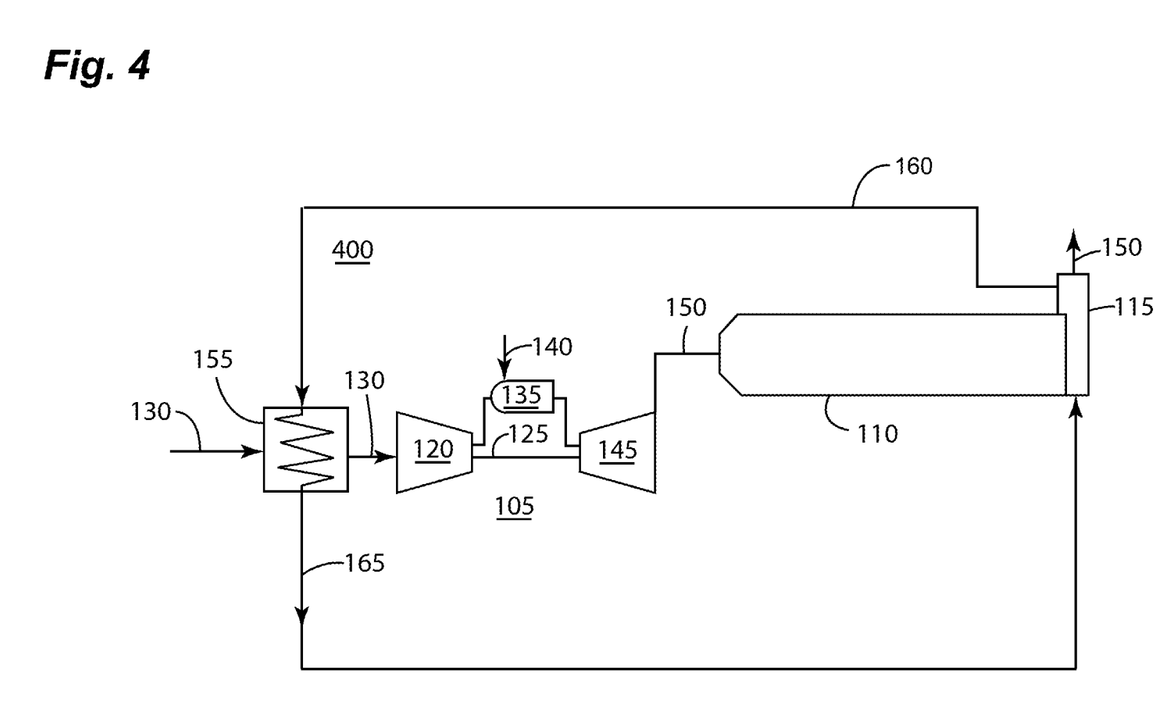
FIG. 4 is a schematic illustrating an example of a third air preheating system in accordance with a fourth embodiment of the present invention.

FIGS. 2 through 4 illustrate alternate embodiments of the present invention. A key difference between all embodiments of tie present invention is the source of energy used to increase the temperature of the inlet-air 130. The discussions of FIG. 2 through 4 focus on the differences between each alternate embodiment and the embodiment illustrated in FIG. 1.

FIG. 2 is a schematic illustrating an example of a second air preheating system 200 for extending the turndown range of a gas turbine 105 in accordance with a second embodiment of the present invention. Here, the primary difference between this second embodiment and the first embodiment is the addition of at least one external energy source (EES) 170, which provides the energy for increasing the temperature of the inlet-air 130.

The EES 170 may provide sufficient energy to heat the inlet-air 130 to the temperature that allows for extending the turndown range. As illustrated in FIG. 2, the EES 170 may eliminate the need for extracting the exhaust-gas 150 from the HRSG 110. In this second embodiment, the exhaust-gas 150 may be used for other purposes and/or may flow through the stack 115. Alternatively, the EES 170 may operate in conjunction with the embodiment of illustrated in FIG. 1. Here, the EES 170 may operate as the primary energy system for increasing the temperature of the inlet-air 130 and the extraction from the HRSG 110, may serve as a secondary energy system (and vice-versa).

The EES 170 may include at least one of the following energy systems: a wind turbine, a boiler, an engine, an additional combustion turbine, an additional HRSG, a power plant, a solar energy source, geothermal energy source, fuel cell/chemical reaction, nuclear process and/or reaction, external process, and combinations thereof; none of which are illustrated in FIG. 2. Each of the aforementioned energy system may indirectly or directly increase the temperature of the inlet-air 130.

For example, but not limiting of, a wind turbine may indirectly increase the temperature of the inlet fluid 130. Here, the energy generated by the wind turbine may heat water within a tank (not illustrated) integrated with the preheater supply line 160. The heated water may flow through the preheater supply line 160 to the air preheater 155. After flowing through the air preheater 155, the heated water may flow through the preheater discharge line 165, which may be integrated with the EES 170. Alternatively, for example, but not limiting of, a boiler may directly increase the temperature of the inlet fluid 130. Here, the preheater supply line 160 may be integrated with a portion of the boiler. The steam or hot water generated by the boiler may flow through the preheater supply line 160 and the air preheater 155. After flowing through the air preheater 155, the steam or hot water may flow through the preheater discharge line 165, which may be integrated with the EES 170.

FIG. 3 is a schematic illustrating an example of a third air preheating system 300 for extending the turndown range of a gas turbine 105 in accordance with a third embodiment of the present invention. Here, the primary difference between this third embodiment and the first embodiment is the addition of the fuel heater 175. Some gas turbines 105 use heated fuel 140 as a way to increase performance. The fuel heater 175 commonly heats the fuel 140 on the site where the gas turbine 105 is located. The fuel heater 175 may have the form of a heat exchanger, or the like.

As illustrated in FIG. 3, the exhaust-gas 150 may exit the HRSG 110 via the preheater supply line 160. In an embodiment of the present invention, the air preheater 155 may include multiple portions allowing for a plurality of inlet flows. As illustrated in FIG. 3, the air preheater 155 may include a first inlet portion integrated with the fuel heater discharge line 185, and a second inlet portion integrated with the preheater supply line 160.

In this third embodiment, the preheater supply line 160 may be integrated with a fuel heater supply line 180. Here, a portion of the exhaust-gas 150 may flow into the fuel heater 175. Another portion of the exhaust-gas 150 may flow into the air preheater 155. After flowing through the fuel heater 175, the exhaust-gas 150 may flow through the fuel heater discharge line 185 to the air preheater 155. After flowing to the air preheater 155, the exhaust-gas 150 may then flow through the preheater discharge line 165 to the stack 115 and/or the HRSG 110, as previously described.

FIG. 4 is a schematic illustrating an example of a fourth air preheating system 400 for extending the turndown range of a gas turbine 105 in accordance with a fourth embodiment of the present invention. Here, the primary difference between this fourth embodiment and the first embodiment is that the exhaust-gas 150 is extracted from the stack 115, as opposed to the HRSG 110, as illustrated in FIG. 1.

In this fourth embodiment of the present invention, an end of the preheater supply line 160 is connected to a portion of the stack 115, where the exhaust-gas 150 is extracted. The exhaust-gas 150 may flow through the preheater supply line 160, which may have an opposite end connected to a potion of the air preheater 155.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram blocks.

The present invention may include a control system, or the like, that has the technical effect of controlling the operating of a gas turbine 105 integrated with an air preheating system. The control system of an embodiment of the present invention may be configured to automatically and/or continuously monitor the gas turbine 105 to determine whether the air preheating system should operate.

Alternatively, the control system may be configured to require a user action to the initiate operation of the air preheating system. An embodiment of the control system of the present invention may function as a stand-alone system. Alternatively, the control system may be integrated as a module, or the like, within a broader system, such as a turbine control or a plant control system.

Figure 5:
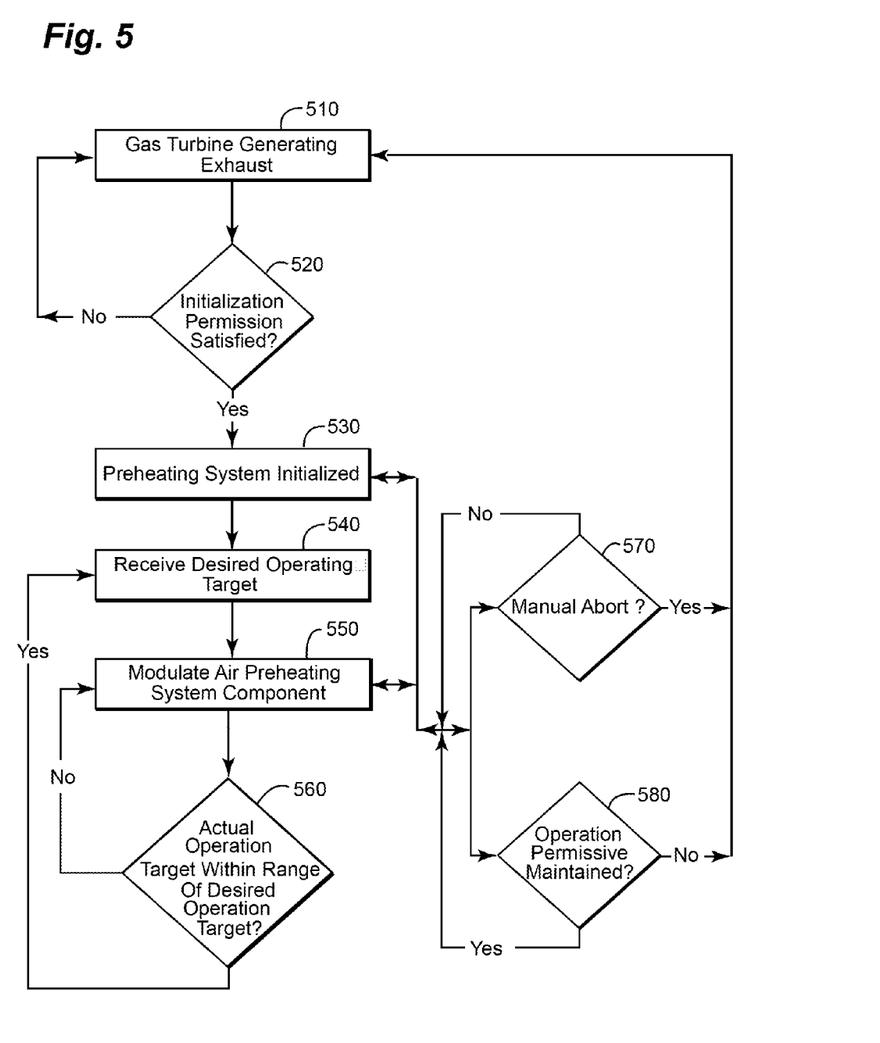
FIG. 5 is a flowchart illustrating a method of controlling an air preheating system in accordance with an embodiment of the present invention.

FIG. 5 is a flowchart illustrating a method 500 of controlling an air preheating system in accordance with an embodiment of the present invention. In an embodiment of the present invention the control system that implements the method 500 may be integrated with a graphical user interface (GUI), or the like. The GUI may allow the operator to navigate through the method 500 described below. The GUI may also provide at least one notification of the status of the air preheating system.

The method 500 may be adapted to control the operation of a variety of configurations of an air preheating system. For example, but not limiting of, the method 500 may control the operation of the first air preheating system 100, the second air preheating system 200, the third air preheating system 300, or the fourth air preheating system 400. Embodiments of these systems were previously described.

In step 510, of the method 500, the gas turbine 105 generates an exhaust. Depending on either the type and/or operation of the gas turbine 105, the generated exhaust may have a flowrate, for example, but not limiting of, of about 10,000 Lb/hr to about 50,000,000 Lb/hr and a temperature of about 100 Degrees Fahrenheit to about 1500 Degrees Fahrenheit.

In step 520, the method 500 may determine whether at least one initialization permissive is satisfied. An embodiment of the present invention may require that the at least one initialization permissive is satisfied before an embodiment of the air preheating system begins to process the increase the temperature of inlet-air 130. The initialization permissive may generally be considered a permissive that confirms the gas turbine 105 and an embodiment of the air preheating system are ready to process the inlet-air 130. In an embodiment of the present invention, the user may define the at least one initialization permissive.

The at least one initialization permissive may include at least one of: a status of an embodiment of the air preheating system; a status of the gas turbine 105: operational readiness of the air preheating system components; and combinations thereof. If the at least one initialization permissive is satisfied then the method 500 may proceed to step 530; otherwise the method 500 may revert to step 510 until the at least one initialization permissive is satisfied.

In step 530, the method 500 may provide a notification to the user that the air preheating system is initialized and ready to process the inlet-air 130. In an embodiment of the present invention, the GUI may provide the notification as a pop-up window, alarm, or other similar methods.

In step 540, the method 500 may receive a desired target for the operation of the gas turbine 105. This desired target might be considered a parameter, setpoint, or other setting, that an operator seeks from the gas turbine 105. An embodiment of the present invention allows the flexibility of selecting which operational parameter the air preheating system should assist the gas turbine 105 in obtaining. The operational target may comprise at least one of the following: an extended turndown range, an efficiency; an output, an emissions target, a heatrate, or combinations thereof. For example, but not limiting of, an operator may desire to increase a turndown range of approximately 25% of the maximum rated load of the gas turbine 105. Here, the control system may determine the required temperature and flowrate off the fluid used by the air preheating system to increase the temperature of the inlet-air 130.

In step 550, the method 550 may modulate at least one component of the air preheating system. Here, the control system may configure the arrangement of the air preheating system and the gas turbine 105 to allow for meeting the desired operation target. For example, but not limiting of, the control system may modulate a component to increase the flow of the fluid within the preheater supply line 160.

In step 560, the method 500 may determine whether the actual operation target is within a range of the desired operation target. Here, the control system may determine an actual value for the operation target. Then, the control system may compare the actual value of the operation target with the desired value of the operation target. For example, but not limiting of, an operator may desire an increase in partload efficiency of 0.5%. Here, the control system may determine the partload efficiency after step 540 was implemented. Then, the actual value of partload efficiency may be compared to the desired value of the partload efficiency. If the actual operation target is within range of the desired operational target, then the method 500 may revert to step 540; otherwise the method 500 may revert to step 550.

In step 570, the method 500 may allow for aborting the operation of the air preheating system. As illustrated in FIG. 5, the operation of the air preheating system may be aborted after the air preheating system has been initialized in step 530. An embodiment of the present invention, may allow for a user to manually abort the operation of the air preheating system. Alternatively, the method 500 may be integrated with a system that allows for the automatic aborting of the operation of the air preheating system. If the operation of air preheating system is aborted, then the method 500 may revert to step 510, otherwise the method 500 proceeds to the next step.

In step 580, the method 500 may determine whether at least one operational permissive is maintained during the operation of the air preheating system. Step 580 may be continuously monitoring the operation of the air preheating system.

The operational permissive may include at least one of: a status of the gas turbine; a status of the air preheating system; a combustion dynamics margin; a status of the operating target; and combinations thereof.

In an embodiment of the present invention, the GUI may notify the user if the operational permissive is not maintained. In an alternate embodiment of the present invention, the method 500 may automatically revert to step 510 if the operational permissive is not maintained.

Figure 6:
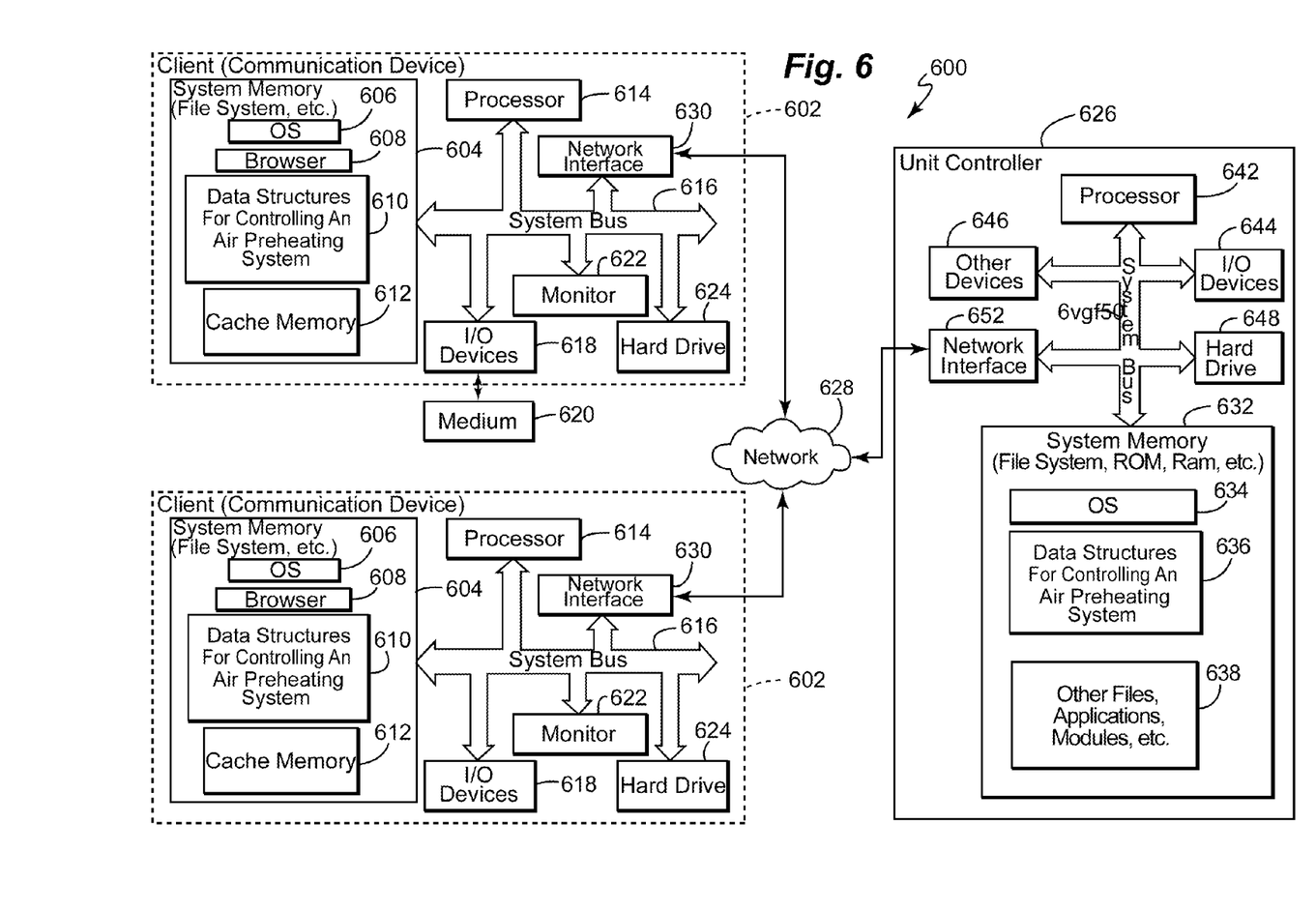
FIG. 6 is a block diagram of an exemplary system of controlling an air preheating system in accordance with an embodiment of the present invention.

FIG. 6 is a block diagram of an exemplary system 600 of controlling an air preheating system in accordance with an embodiment of the present invention. The elements of the method 500 may be embodied in and performed by the system 600. The system 600 may include one or more user or client communication devices 602 or similar systems or devices (two are illustrated in FIG. 6). Each communications device 602 may be for example, but not limited to, a computer system, a personal digital assistant, a cellular phone, or any device capable of sending and receiving an electronic message.

The communication device 602 may include a system memory 604 or local file system. The system memory 604 may include for example, but is not limited to, a read only memory (ROM) and a random access memory (RAM). The ROM may include a basic input/output system (BIOS). The BIOS may contain basic routines that help to transfer informational between elements or components of the communication device 602. The system memory 604 may contain an operating system 606 to control overall operation of the communication device 602. The system memory 604 may also include a browser 608 or web browser. The system memory 604 may also include data structures 610 or computer-executable code for controlling an air preheating system that may be similar or include elements of the method 500 in FIG. 5.

The system memory 604 may further include a template cache memory 612, which may be used in conjunction with the method 500 in FIG. 5 for controlling an air preheating system.

The communication device 602 may also include a processor or processing unit 614 to control operations of the other components of the communication device 602. The operating system 606, browser 608, and data structures 610 may be operable on the processing unit 614. The processing unit 614 may be coupled to the memory system 604 and other components of the communication device 602 by a system bus 316.

The communication device 602 may also include multiple input devices (I/O), output devices or combination input/output devices 618. Each input/output device 618 may be coupled to the system bus 616 by an input/output interface (not shown in FIG. 6). The input and output devices or combination I/O devices 618 permit a user to operate and interface with the communication device 602 and to control operation of the browser 608 and data structures 610 to access, operate and control the software to utilize an air preheating system. The I/O devices 618 may include a keyboard and computer pointing device or the like to perform the operations discussed herein.

The I/O devices 618 may also include for example, but are not limited to, disk drives, optical, mechanical, magnetic, or infrared input/output devices, modems or the like. The I/O devices 618 may be used to access a storage medium 620. The medium 620 may contain, store, communicate, or transport computer-readable or computer-executable instructions or other information for use by or in connection with a system, such as the communication devices 602.

The communication device 602 may also include or be connected to other devices, such as a display or monitor 622. The monitor 622 may permit the user to interface with the communication device 602.

The communication device 602 may also include a hard drive 624. The hard drive 624 may be coupled to the system bus 616 by a hard drive interface (not shown in FIG. 6). The hard drive 624 may also form part of the local file system or system memory 604. Programs, software, and data may be transferred and exchanged between the system memory 604 and the hard drive 624 for operation of the communication device 602.

The communication device 602 may communicate with at least one unit controller 626 and may access other servers or other communication devices similar to communication device 602 via a network 628. The system bus 616 may be coupled to the network 628 by a network interface 630. The network interface 630 may be a modem, Ethernet card, router, gateway, or the like for coupling to the network 628. The coupling may be a wired or wireless connection. The network 628 may be the Internet, private network, an intranet, or the like.

The at least one unit controller 626 may also include a system memory 632 that may include a file system, ROM, RAM, and the like. The system memory 632 may include an operating system 634 similar to operating system 606 in communication devices 602. The system memory 632 may also include data structures 636 for controlling an air preheating system. The data structures 636 may include operations similar to those described with respect to the method 500 for controlling an air preheating system. The server system memory 632 may also include other files 638, applications, modules, and the like.

The at least one unit controller 626 may also include a processor 642 or a processing unit to control operation of other devices in the at least one unit controller 626. The at least one unit controller 626 may also include I/O device 644. The I/O devices 644 may be similar to I/O devices 618 of communication devices 602. The at least one unit controller 626 may further include other devices 646, such as a monitor or the like to provide an interface along with the I/O devices 644 to the at least one unit controller 626. The at least one unit controller 626 may also include a hard disk drive 648. A system bus 650 may connect the different components of the at least one unit controller 626. A network interface 652 may couple the at least one unit controller 626 to the network 628 via the system bus 650.

The flowcharts and step diagrams in the figures illustrate the architecture, functionality, and operation of possible implementations of systems, methods, and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the step diagrams and/or flowchart illustration, and combinations of steps in the step diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of controlling a gas turbine operation, the method comprising:
    receiving an inlet-air in a compressor of a gas turbine, wherein the gas turbine produces an exhaust-gas;
    providing an air preheating system comprising at least one heat exchanging section, wherein the air preheating system heats the inlet-air before the inlet-air flows to the compressor;
    receiving an operating target range, wherein the operating target range comprises at least one of: an extended turndown range, a gas turbine efficiency, an output, a heatrate and an emissions target;
    utilizing a fluid to heat the inlet-air; wherein the fluid flows through at least a portion of the at least one heat exchanging section, and wherein the fluid flows from a source external to the gas turbine, the source external to the gas turbine comprising at least one of a heat recovery steam generator (HRSG), a wind turbine, a boiler, an additional gas turbine, a solar energy source, a geothermal energy source, a fuel-cell chemical reaction and a nuclear process and/or reaction; and
    determining whether the gas turbine is operating within the operating target range.

2. The method of claim 1 further comprising the step of determining whether at least one initialization permissive is satisfied.

3. The method of claim 2, wherein the at least one initialization permissive comprises at least one of: a status of the air preheating system, a status of the gas turbine and combinations thereof.

4. The method of claim 1, further comprising determining whether at least one operational permissive is satisfied.

5. The method of claim 4, wherein the at least one operational permissive comprises at least one of a status of the gas turbine, a status of the air preheating system, a combustion dynamics margin, a status of the operating target range, and combinations thereof.

6. The method of claim 1, wherein the method allows for aborting the operation of the air preheating system.

7. The method of claim 1, further comprising providing a heat recovery steam generator (HRSG), wherein the HRSG receives a portion of the exhaust-gas and generates steam.

8. The method of claim 1, further comprising increasing the extended turndown range up to about 50% of a rated load of the gas turbine.

9. The method of claim 1, further comprising the step of heating the inlet-air to up to about 400 degrees Fahrenheit above an unheated temperature of the inlet-air.

10. The method of claim 1, further comprising determining an optimum location on the HRSG for the exhaust-gas to exit.

11. The method of claim 10, further comprising utilizing at least one factor to determining the optimum location, wherein the at least one factor comprises at least one of: a fluid temperature, a fluid flowrate, and an energy source.

12. The method of claim 1, further comprising providing a fuel heater located upstream of the air preheating system and downstream of the HRSG, wherein the at least one fuel heater receives a portion of the exhaust-gas exiting the HRSG.

13. The method of claim 12, further comprising allowing for the exhaust gas discharged from the fuel heater along a fuel heater discharge line to enter the air preheating system.

14. The method of claim 1, further comprising providing a stack, wherein the stack receives the exhaust-gas flowing downstream of the HRSG.

15. The method of claim 1, wherein the extended turndown range is determined by at least one factor, wherein the at least one factor comprises: an ambient condition, at least one exhaust emissions limit, turbine operability limits, and a maximum temperature range.

16. The method of claim 15, wherein the ambient conditions comprises at least one of: an ambient temperature, an ambient pressure, an ambient humidity, or combinations thereof.

17. The method of claim 1 further comprising increasing an efficiency of a powerplant by up to about 10%, wherein the gas turbine is located at the powerplant.

* * * * *